(12) United States Patent
Lim

(10) Patent No.: US 7,695,835 B2
(45) Date of Patent: Apr. 13, 2010

(54) BATTERY PACK INCLUDING LEAD PLATE HAVING REINFORCEMENT GROOVE

(75) Inventor: Hong Sup Lim, Yongin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 972 days.

(21) Appl. No.: 11/156,602

(22) Filed: Jun. 21, 2005

(65) Prior Publication Data

US 2006/0003192 A1 Jan. 5, 2006

(30) Foreign Application Priority Data

Jun. 21, 2004 (KR) .................. 10-2004-0046269

(51) Int. Cl.
*H01M 14/00* (2006.01)

(52) U.S. Cl. .............................. 429/7; 429/178; 429/65; 429/185

(58) Field of Classification Search ............... 429/7, 429/96, 97, 160, 161, 158, 178, 185, 65, 429/61

See application file for complete search history.

(56) References Cited

U.S. PATENT DOCUMENTS

| | | | | |
|---|---|---|---|---|
| 6,027,831 | A * | 2/2000 | Inoue et al. | 429/181 |
| 7,381,494 | B2 * | 6/2008 | Fong et al. | 429/181 |
| 2003/0003357 | A1 * | 1/2003 | Tamai et al. | 429/181 |
| 2004/0126651 | A1 * | 7/2004 | Kim et al. | 429/61 |

\* cited by examiner

*Primary Examiner*—Raymond Alejandro
(74) *Attorney, Agent, or Firm*—H.C. Park & Associates, PLC

(57) ABSTRACT

A battery pack has increased attachment strength of a protective circuit module molded from a resin on top of a rechargeable battery including an electrode assembly, a can, and a cap assembly. The reinforcement groove that is formed on the lead plate retains the molded portion, which has the protective circuit module therein, and increases the strength of the molded portion to the battery.

12 Claims, 4 Drawing Sheets

BATTERY PACK INCLUDING LEAD PLATE HAVING REINFORCEMENT GROOVE

CROSS REFERENCE TO RELATED APPLICATION

This application claims priority to and the benefit of Korean Patent Application No. 2004-0046269, filed on Jun. 21, 2004, which is hereby incorporated by reference for all purposes as if fully set forth herein.

BACKGROUND OF THE INVENTION

1. Field of the Invention

The present invention relates to a battery pack. In particular, the present invention relates to a battery pack that has increased attachment strength of a protective circuit module that is molded by a resin and is positioned on top of a battery that comprises an electrode assembly, a can, and a cap assembly.

2. Description of the Prior Art

Recently, rechargeable batteries have been widely researched and developed because they can be manufactured in a compact size and can provide significant amounts of voltage. Typical examples of rechargeable batteries that have recently been developed include nickel-hydrogen (Ni-MH) batteries, lithium (Li) batteries, and lithium ion batteries.

Generally, the battery (rechargeable or nonrechargeable) of a battery pack is formed by placing an electrode assembly comprising positive and negative electrode plates and a separator into a can that is made of aluminum or an aluminum alloy. The can is topped with a cap assembly, an electrolyte is injected into the can, and the can is sealed. When the can is made of aluminum or an aluminum alloy, the battery is lighter due to the low weight of aluminum and does not corrode even when it is used for a long period of time under a high voltage.

The battery normally has an electrode terminal that is positioned on top of the battery while being insulated from the periphery. The electrode terminal is connected to an electrode inside the battery and acts as either a positive electrode or a negative electrode. The can itself has the opposite polarity of the electrode terminal.

Under certain circumstances, a battery may discharge a large amount of energy at one time. In particular, a charged battery pack stores energy that has been supplied from another energy source during a charging process. When a malfunction such as an internal short circuit occurs, the energy that has accumulated in the battery is discharged quickly and may result in a fire or explosion.

In the widely-used lithium-based rechargeable batteries, the lithium itself has a high reactivity and is very likely to catch on fire or to explode when the battery malfunctions. In lithium ion batteries, lithium exists not in a metal state but in a much safer ionic state. However, the materials that are used as the negative electrode and the non-aqueous electrolyte are flammable and are very likely to catch fire or to explode when the battery malfunctions.

For these reasons, a battery pack is provided with various safety devices to prevent it from catching fire or exploding when it has been charged or while it is being charged. Such safety devices interrupt current flow when the temperature or voltage of the battery rises due to overcharging or over-discharging. The safety devices include a protective circuit module that is connected to the battery and is adapted to sense abnormal current or voltage and interrupt the flow of current, a positive temperature coefficient (PTC) thermistor that is actuated by overheating due to abnormal current, and a bimetal.

It is generally difficult to couple the electrode of a battery to the electrical terminal of a protective circuit module by direct welding because of the shape and composition of the battery. Therefore, a conductive structure referred to as a "lead plate" is used to couple the positive electrode and negative electrode of the battery to the electrical terminal of the safety device. The lead plate is usually made of nickel, nickel alloy, or nickel-plated stainless steel.

FIG. 1 is an exploded perspective view of a conventional lithium ion battery pack before it is coupled by a molded resin. FIG. 2 is a perspective view of a battery pack that has a protective circuit module that is molded from a molded resin and is attached to a battery.

Referring to FIG. 1 and FIG. 2, a can-type battery pack includes a battery 10 and a protective circuit module 20. The battery 10 includes a can 12 which contains an electrode assembly and is sealed on top by a cap plate 13.

The cap plate 13 has a size and a shape corresponding to the open top of the can 12. The cap plate 13 has a negative electrode terminal 14 that is formed at its center, as well as a negative electrode connection lead 16 and a lead plate 18 that are coupled to both sides of the top surface of the cap plate 13. An end of the negative electrode connection lead 16 is coupled to the negative electrode terminal 14 and a surface of the other end protrudes to the top surface of the cap plate 13. A surface of the lead plate 18 protrudes to the top surface of the cap plate 13.

Reference numeral 15 in FIG. 1 refers to an insulation plate that is positioned in between the negative electrode connection lead 16 and the cap plate 13.

The protective circuit module 20 includes a top surface that has external input and output terminals 22 and 23, respectively that are formed thereon. The bottom surface of the protective circuit module 20 has a circuit portion (not labeled) and connection terminals 26 and 28 that are formed thereon. The negative electrode connection terminal 26 and a positive electrode connection terminal 28 and are L-shaped so that they can be coupled to the negative electrode connection lead 16 and the lead plate 18 of the cap plate 13, respectively. The negative electrode connection lead 16 and the lead plate 18 of the cap plate 13 are generally coupled to the connection plates 26 and 28 by resistance spot welding.

The protective circuit module 20, as shown in FIG. 2, is molded by a molded portion 30 and is attached to the top of the battery. The external input and output terminals 22 and 23 are exposed to the top surface of the molded portion 30.

The protective circuit module 20 is fixed to the top of the battery 10 by forming a molded portion 30 from a resin. However, the cap plate 13 and the lead plate 18 that contacts the molded portion 30 are made of metal and the contact area is typically small. Consequently, the attachment strength of the protective circuit module 20 to the battery 10 is weak.

When the molded portion is subjected to a force in the lateral direction or when the bending external force that acts on the contact surface of the molded portion becomes larger, the molded portion may be easily twisted from the battery.

SUMMARY OF THE INVENTION

The present invention provides a battery pack that has increased attachment strength of a protective circuit module molded by a resin on top of a battery including an electrode assembly, a can, and a cap assembly.

The present invention is advantageous in that a reinforcement groove that is formed on a lead plate couples to the molded portion which comprises the protective circuit module therein thus increasing the bond strength of the molded portion to the battery. In addition, the reinforcement groove holds the molded portion in place even when it is subjected to a force in the lateral direction and prevents it from being twisted.

Additional features of the invention will be set forth in the description which follows, and in part will be apparent from the description, or may be learned by practice of the invention.

The present invention discloses a battery pack comprising a rechargeable battery that is provided with a cap assembly that has an electrode assembly formed by winding positive and negative electrode plates with a separator interposed between them. The battery further comprises a can for containing the electrode assembly and an electrolyte and a cap plate for sealing the top of the can with a lead plate that is coupled with the rechargeable battery and the protective circuit module. The battery also comprises a protective circuit module that is coupled to the top of the battery, wherein the lead plate has a bottom surface and a lateral wall that extends upward from the bottom surface and has a reinforcement groove that is formed thereon in a predetermined position.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 8b is a front view of the lead plate shown in FIG. 8a.

DETAILED DESCRIPTION OF THE ILLUSTRATED EMBODIMENTS

Figure 3:
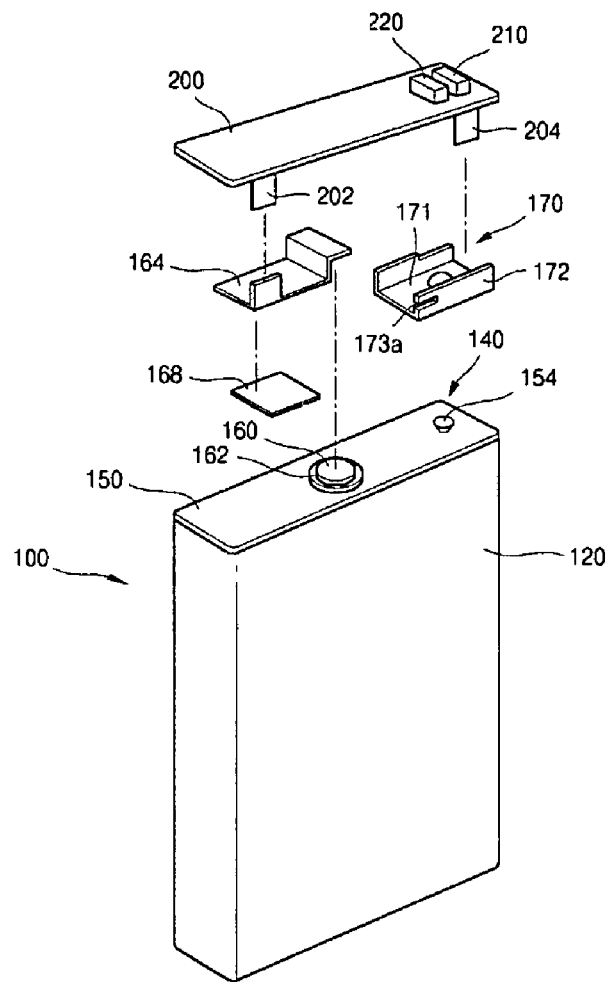
FIG. 3 is an exploded perspective view showing a battery pack according to an exemplary embodiment of the present invention.

FIG. 3 is an exploded perspective view of a battery pack according to an exemplary embodiment of the present invention A can-type battery pack according to the present invention, as shown in FIG. 3 includes a battery 100 and a protective circuit module 200. The battery 100 includes a can 120 that contains an electrode assembly (not shown in the drawings) and is sealed by a cap assembly 140.

The battery pack may further comprise a molded portion (not shown in FIG. 3) that is formed on the top of the battery to mold it with the protective circuit module.

The can 120 for a rectangular lithium ion battery is a metallic container that has a prismatic shape with an open top. It is generally made of aluminum or an aluminum alloy that is lightweight and resists corrosion. The can 120 acts as a container for the electrode assembly which includes a positive electrode, a separator, and a negative electrode, as well as for an electrolyte. The electrode assembly is inserted into the can 120 via its top opening, which is then sealed by the cap assembly 140.

The cap assembly 140 includes a cap plate 150 and an electrode terminal 160.

The cap plate 150 has a planar size and shape that corresponds to the top opening of the can 120. It has a terminal through-hole (not shown in the drawings) that is formed at its center and an electrolyte injection hole 154 that is formed on its side. The electrode terminal 160 is inserted into and is coupled to the terminal through-hole. The electrolyte injection hole 154 is used to inject an electrolyte into the can 120 that is sealed by the cap assembly 140. After the electrolyte injection, the electrolyte injection hole 154 is sealed by a cap that is welded to it. The cap plate 150 is preferably made of the same material as the can 120 (i.e., aluminum or an aluminum alloy) to have a better weld with the can 120.

The electrode terminal 160 extends through the terminal through-hole and is coupled thereto. A tubular gasket 162 is positioned on the exterior of the electrode terminal 160 to insulate the electrode terminal 160 from the cap plate 150. The electrode terminal 160 generally acts as a negative electrode terminal. An insulation plate (not shown in the drawings) is positioned on the bottom surface of the cap plate 150 near the terminal through-hole of the cap plate 150. A terminal plate (not shown in the drawings) is positioned on the bottom surface of the insulation plate. The electrode terminal 160 has a negative electrode connection lead 164 that is formed on the top of it, and is welded to the connection terminal 202 of the protective circuit module 200 to couple the electrode terminal 160 to the negative electrode of the protective circuit module 200.

Reference numeral 168 in FIG. 3 refers to an insulation plate that insulates the negative electrode connection lead 164 from the cap plate 150.

Figure 4:
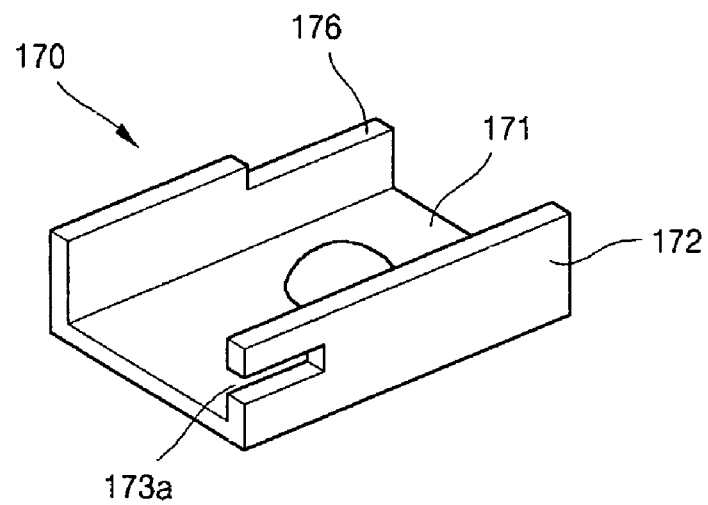
FIG. 4 is a perspective view showing a lead plate according to an exemplary embodiment of the present invention.

Referring to FIG. 4, the lead plate 170 includes a bottom surface 171 and a lateral wall 172 that extends upward from a side of the bottom surface 171. The lateral wall 172 has a reinforcement groove 173a formed on it. The lead plate 170 may include another lateral wall 176 that extends upward from the other side of the bottom surface 171. Particularly, the lead plate 170 includes at least one lateral wall that extends upward from each side of the bottom surface 171. The connection terminal 204 of the protective circuit module 200 is welded to the lateral wall 172 of the lead plate 170 to couple the cap plate 150 to the protective circuit module 200.

The bottom surface 171 of the lead plate 170 is attached to the top of the electrolyte injection hole 154 by laser welding. The depth of welding of the lead plate 170 may be 0.15-0.50 mm depending on the thickness and composition of the cap plate 150 and the lead plate 170.

Preferably, the lead plate 170 is made of nickel, nickel alloy, or nickel-plated stainless steel, for example, and has a thickness of 0.05-0.45 mm. The thickness of the lead plate 170 depends on the thickness of the can 120 and the convenience in welding. If the lead plate 170 is very thick, it advantageously acts as a support and increases the resistance to an external force when a pack battery, which is formed by filling the space between the can 120 sealed by the cap assembly 140 and the protective circuit module 200 with a resin, is twisted or bent.

The lateral wall 172 has a reinforcement groove 173a that is formed at a predetermined height between the upper and lower portions of an end of the lateral wall 172. The term "reinforcement groove" according to the present invention refers to a removed portion of a lateral wall or a protruded portion of a lateral wall and may include, but is not limited to a notch, a cutout, an indent, and a protrusion. As shown in FIG. 4, the reinforcement groove 173a may be formed in a rectangular shape. When the connection terminals 202 and 204 of the protective circuit module 200 are welded to the lateral wall 172, the reinforcement groove 173a may secure an area necessary for the welding.

The protective circuit module 200 includes a top surface that has external input and output terminals 210 and 220 that are formed thereon, a bottom surface that has a circuit portion (not shown in the drawing), and connection terminals 202 and 204 that are formed thereon. A negative electrode connection terminal 202 and a positive electrode connection terminal 204 have an L-shaped configuration to allow coupling to the negative electrode connection lead 164 and to the lead plate 170. The lead plates 164 and 170 of the cap plate 150 are generally coupled to the connection terminals 202 and 204 by resistance spot welding.

The protective circuit module 200, referring to FIG. 3 is molded by a molded portion that is attached to the top of the battery. The external input and output terminals 210 and 220 are exposed to the top surface of the molded portion.

Figure 5:
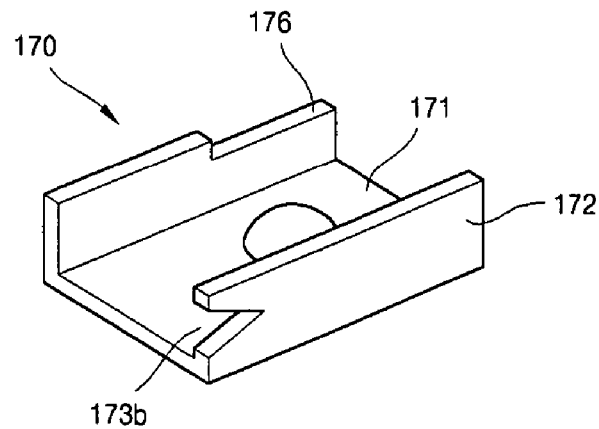
FIG. 5 is a perspective view showing a lead plate according to another exemplary embodiment of the present invention.

FIG. 5 shows another exemplary embodiment of the present invention.

The reinforcement groove 173b, as shown in FIG. 5 may be formed in a triangular shape. The reinforcement groove 173b may also be formed in other various shapes, including, but not limited to rectangular and other polygonal shapes. In addition, the reinforcement groove 173b may have a curved shape.

Figure 6:
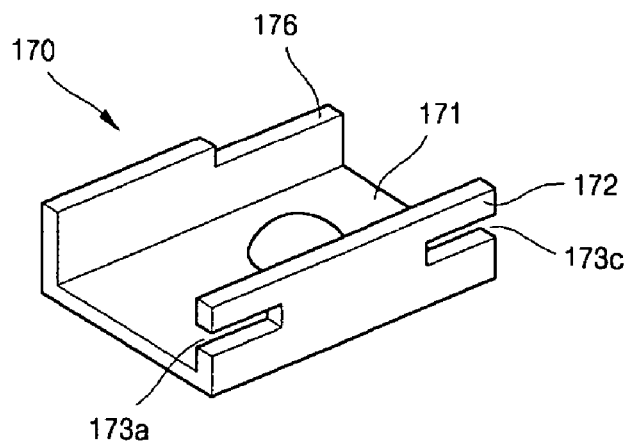
FIG. 6 is a perspective view showing a lead plate according to another exemplary embodiment of the present invention.

FIG. 6 shows another exemplary embodiment of the present invention.

A reinforcement groove 173c, as shown in FIG. 6 may also be formed on the other end of the lateral wall 172. The shape of the reinforcement groove 173c in this case may be the same as or different from the shape of the reinforcement groove 173a formed on the other end of the lateral wall.

Figure 7:
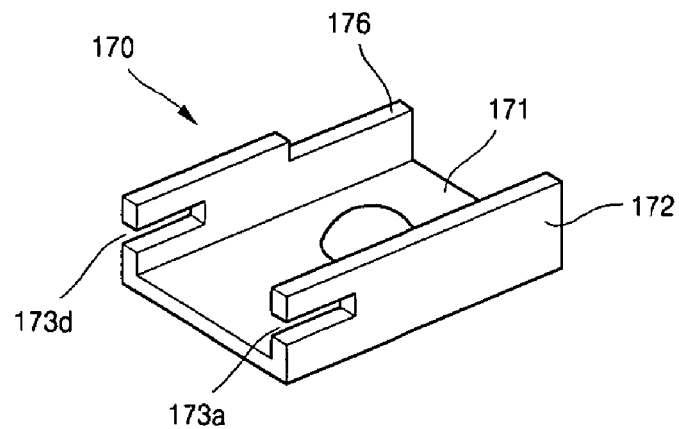
FIG. 7 is a perspective view showing a lead plate according to another exemplary embodiment of the present invention.

FIG. 7 shows another exemplary embodiment of the present invention.

A reinforcement groove 173d, as shown in FIG. 7 may also be formed on the lateral wall 176 that is formed on the other side of the bottom surface 171. The reinforcement groove 173d may be formed in various shapes.

Figure 8A:
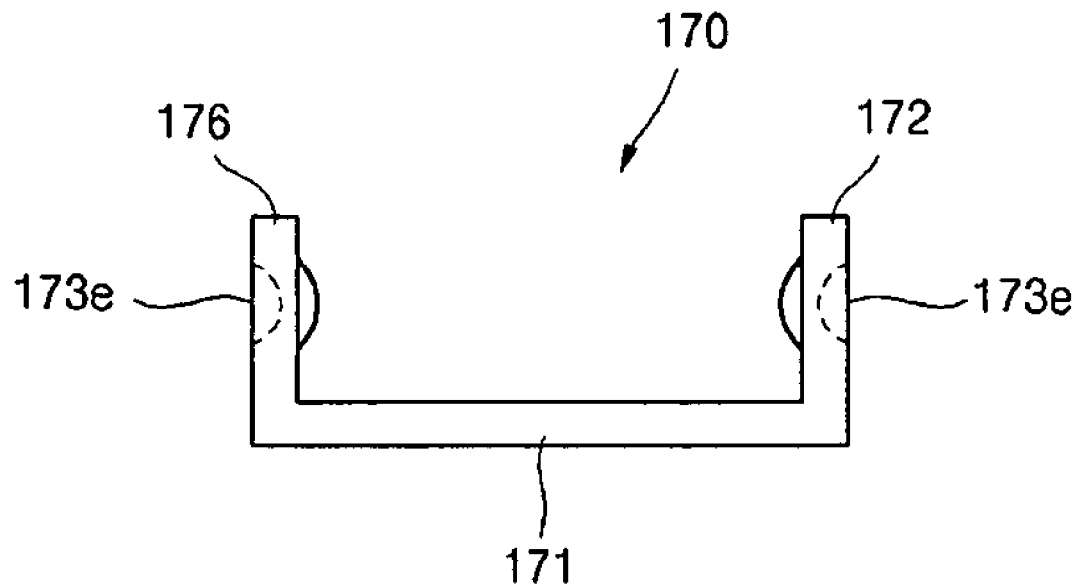
FIG. 8a is a lateral view showing a lead plate according to another exemplary embodiment of the present invention.
Figure 8B:
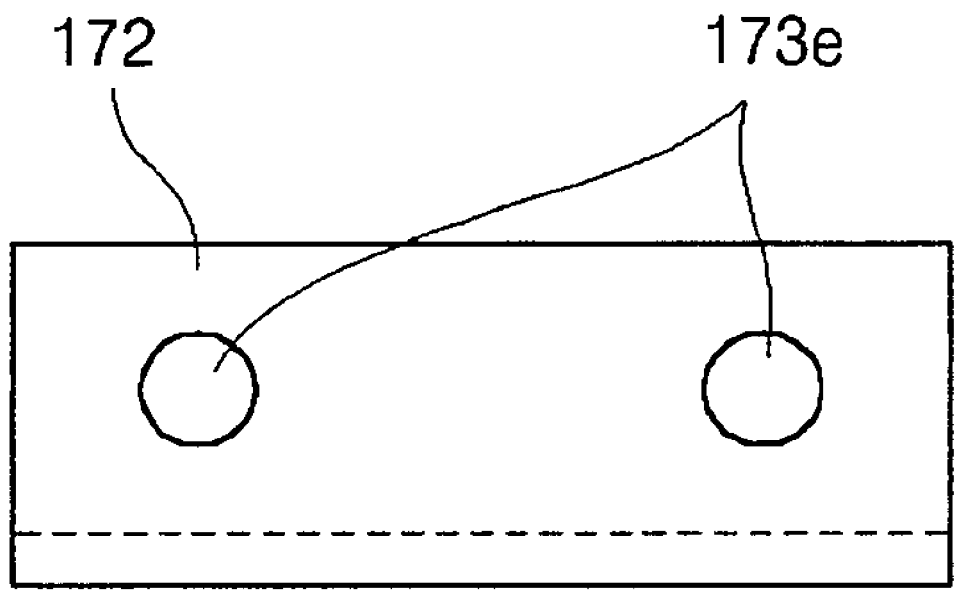

FIG. 8a and FIG. 8b show another exemplary embodiment of the present invention.

The reinforcement groove 173e, as shown in FIG. 8a and FIG. 8b may be formed on a predetermined position on a lateral surface of the lateral wall 172, to protrude inward. In this case, the contact area between the lateral wall 172 and the resin increases further, as does the attachment strength. At least one reinforcement groove 173e may be formed depending on the area of the lateral wall 172 and the size of the reinforcement groove 173e. When the reinforcement groove 173e is small, in the present embodiment, it is formed as a small protrusion on the lateral wall. The reinforcement groove 173e of the lateral wall 172 may be formed similarly on the lateral wall 176 on the other side of the bottom surface 171.

The operation of the battery pack according to the present invention will now be described.

Figure 1:
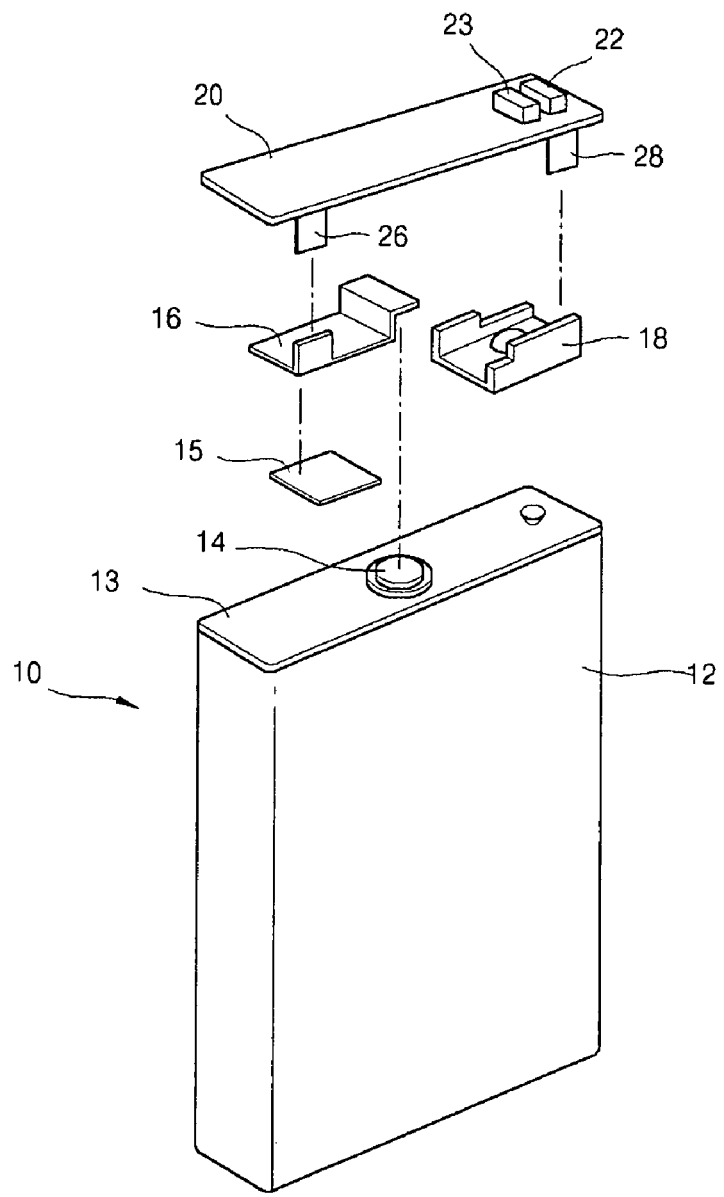
FIG. 1 is an exploded perspective view showing a conventional lithium ion battery pack before being coupled by a molded resin.
Figure 2:
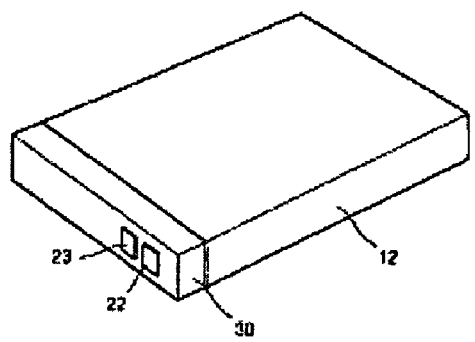
FIG. 2 is a perspective view showing a battery pack that has a protective circuit module that is molded from a molded resin and attached to a battery.

The protective circuit module 200 is coupled to the top of the battery 100 by welding the respective connection terminals 202 and 204 to the connection lead 164 and the lead plate 170, respectively. The lead plate 170 may have reinforcement grooves 173a, 173b, 173c, 173d, and 173e formed on each lateral wall thereof. The battery 100 and the protective circuit module 200 are placed into a mold and a resin is poured to form a molded portion, as shown in FIG. 2. As the resin fills the space between the battery 100 and the protective circuit module 200 that is seated in the molded portion, it also flows into and fills the reinforcement groove 173a. This improves the coupling between the molded portion and the lead plate 170. In particular, the resin that fills the reinforcement groove 173a reduces movement in a direction perpendicular to the battery 100, and increases the strength of attachment between the molded portion and the battery 100.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A battery pack, comprising:
   a rechargeable battery;
   a protective circuit module that is coupled to the rechargeable battery;
   a lead plate that is coupled with the rechargeable battery and the protective circuit module; and
   a molded portion that is formed on top of the rechargeable battery and molds the protective circuit module and the lead plate,
   wherein the rechargeable battery comprises an electrode assembly, a can for housing the electrode assembly and an electrolyte, and a cap assembly for sealing the can,
   wherein the lead plate comprises a bottom surface and a first lateral wall that extends upward from the bottom surface and has a reinforcement groove coupled to the molded portion, the first lateral wall having a bottom edge adjacent to the bottom surface and a top edge opposite the bottom edge, the reinforcement groove being spaced apart from the bottom edge and the top edge, and
   wherein the first lateral wall has an end edge connected to the bottom edge and the top edge and the reinforcement groove has a rectangular shape defined by an opening in the end edge spaced apart from the bottom edge and the top edge and the reinforcement groove is bounded on three remaining sides of the rectangular shape by internal edges of the lateral wall, and the molded portion is filled in the reinforcement groove and coupled to the internal edges.

2. The battery pack of claim 1,
   wherein the lead plate has a second lateral wall.

3. The battery pack of claim 2,
   wherein the second lateral wall has a reinforcement groove.

4. The battery pack of claim 1,
   wherein the first lateral wall has at least one additional reinforcement groove.

5. The battery pack of claim 1,
   wherein the reinforcement groove has a rectangular shape.

6. The battery pack of claim 1,
   wherein the reinforcement groove has a polygonal or curved shape.

7. The battery pack of claim 1,
wherein the reinforcement groove protrudes inward from a lateral surface thereof.

8. The battery pack of claim 1,
wherein the lead plate comprises nickel or a nickel alloy.

9. The battery pack of claim 8,
wherein the lead plate is about 0.05 mm-0.45 mm thick.

10. The battery pack of claim 1,
wherein the first lateral wall has a downward facing edge defining an upper boundary of the reinforcement groove, and the molded portion is filled in the reinforcement groove and coupled to the downward facing edge.

11. The battery pack of claim 10,
wherein the downward facing edge is parallel to the bottom edge.

12. The battery pack of claim 10,
wherein the downward facing edge is curved.

* * * * *